US011032240B2

(12) United States Patent
Ribeiro

(10) Patent No.: US 11,032,240 B2
(45) Date of Patent: *Jun. 8, 2021

(54) ESTABLISHING CONNECTIONS BETWEEN DATA STORAGE DEVICES

(71) Applicant: Western Digital Technologies, Inc., San Jose, CA (US)

(72) Inventor: Gabriel Ribeiro, San Francisco, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,462

(22) Filed: Apr. 18, 2020

(65) Prior Publication Data
US 2020/0252370 A1 Aug. 6, 2020

Related U.S. Application Data

(63) Continuation of application No. 15/096,102, filed on Apr. 11, 2016, now Pat. No. 10,645,059.

(51) Int. Cl.
*H04L 29/08* (2006.01)
*H04L 29/12* (2006.01)

(52) U.S. Cl.
CPC ........ *H04L 61/2517* (2013.01); *H04L 61/256* (2013.01); *H04L 61/2521* (2013.01); *H04L 61/2553* (2013.01); *H04L 61/2582* (2013.01); *H04L 67/1042* (2013.01); *H04L 67/1097* (2013.01); *H04L 61/2564* (2013.01); *H04L 61/2575* (2013.01)

(58) Field of Classification Search
None
See application file for complete search history.

(56) References Cited

U.S. PATENT DOCUMENTS

2006/0075127 A1    4/2006  Juncker et al.
2017/0118170 A1*   4/2017  Wang .................. H04L 61/2517

FOREIGN PATENT DOCUMENTS

| CN | 101848235 A | 9/2010 |
| CN | 101883056 A | 11/2010 |
| CN | 101945141 A | 1/2011 |
| CN | 103442224 A | 12/2013 |

(Continued)

OTHER PUBLICATIONS

Himanshu Arora, C Socket Programming for Linux with a Server and Client Example Code, Dec. 19, 2011, https://www.thegeekstuff.com/2011/12/c-socket-programming/?utm_source=feedburner (Year: 2011).*

(Continued)

*Primary Examiner* — Nicholas R Taylor
*Assistant Examiner* — Ho T Shiu
(74) *Attorney, Agent, or Firm* — Chang & Hale LLP

(57) ABSTRACT

Systems and methods are disclosed for establishing connections between computing devices. A first computing device may communicate data via a symmetric NAT and a second computing device may communicate data via a cone NAT. The first computing device may establish a connection, such as a peer-to-peer (P2P) connection, between the first computing device and the second computing device via the symmetric NAT and the cone NAT.

20 Claims, 7 Drawing Sheets

(56) References Cited

FOREIGN PATENT DOCUMENTS

CN 104519061 A 4/2015

OTHER PUBLICATIONS www.hackertarget.com, Aug. 28, 2009, Nmap Cheat Sheet, https://hackertarget.com/nmap-cheatsheet-a-quick-reference-guide/ (Year: 2009).*

Gordon Lyon, Nmap network scanning, Documentation, Jan. 1, 2009, https://nmap.org/book/man-port-scanning-basics.html (Year: 2009).*

* cited by examiner

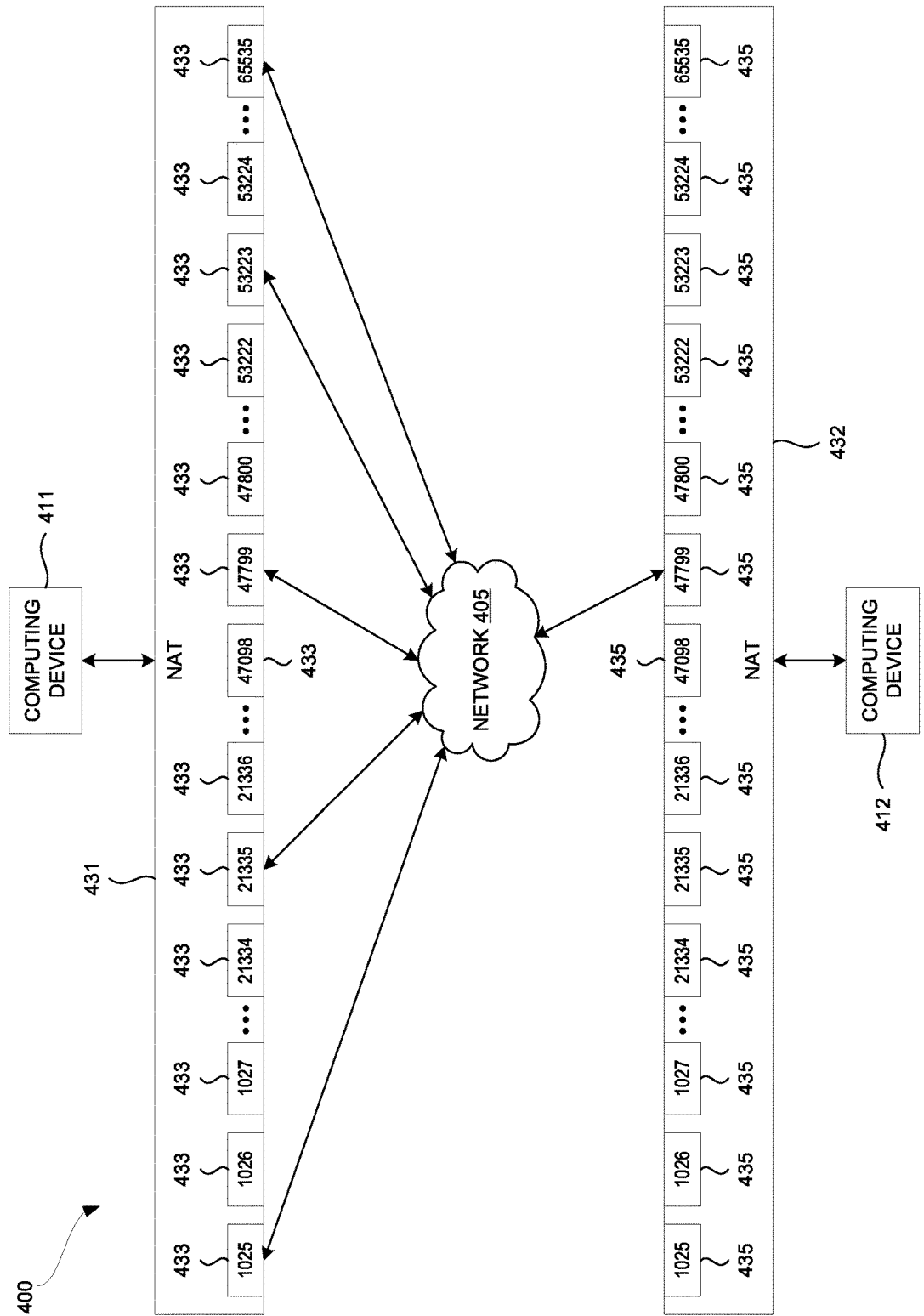

ESTABLISHING CONNECTIONS BETWEEN DATA STORAGE DEVICES

CROSS-REFERENCE TO RELATED APPLICATIONS

The present application is a continuation of U.S. patent application Ser. No. 15/096,102 filed on Apr. 11, 2016, entitled ESTABLISHING CONNECTIONS BETWEEN DATA STORAGE DEVICES, the disclosure of which is hereby incorporated by reference in its entirety.

BACKGROUND

Distribution of data storage across one or more data storage devices can provide increased data security through data redundancy. One type of data storage device may be a direct-attached storage (DAS) device. DAS devices may provide one or more computing devices with direct access to data via a connection cable (e.g., via a direct or physical connection). Another type of data storage device may be a network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 4A is a diagram of a data storage system, according to an embodiment.

DETAILED DESCRIPTION

Figure 1:
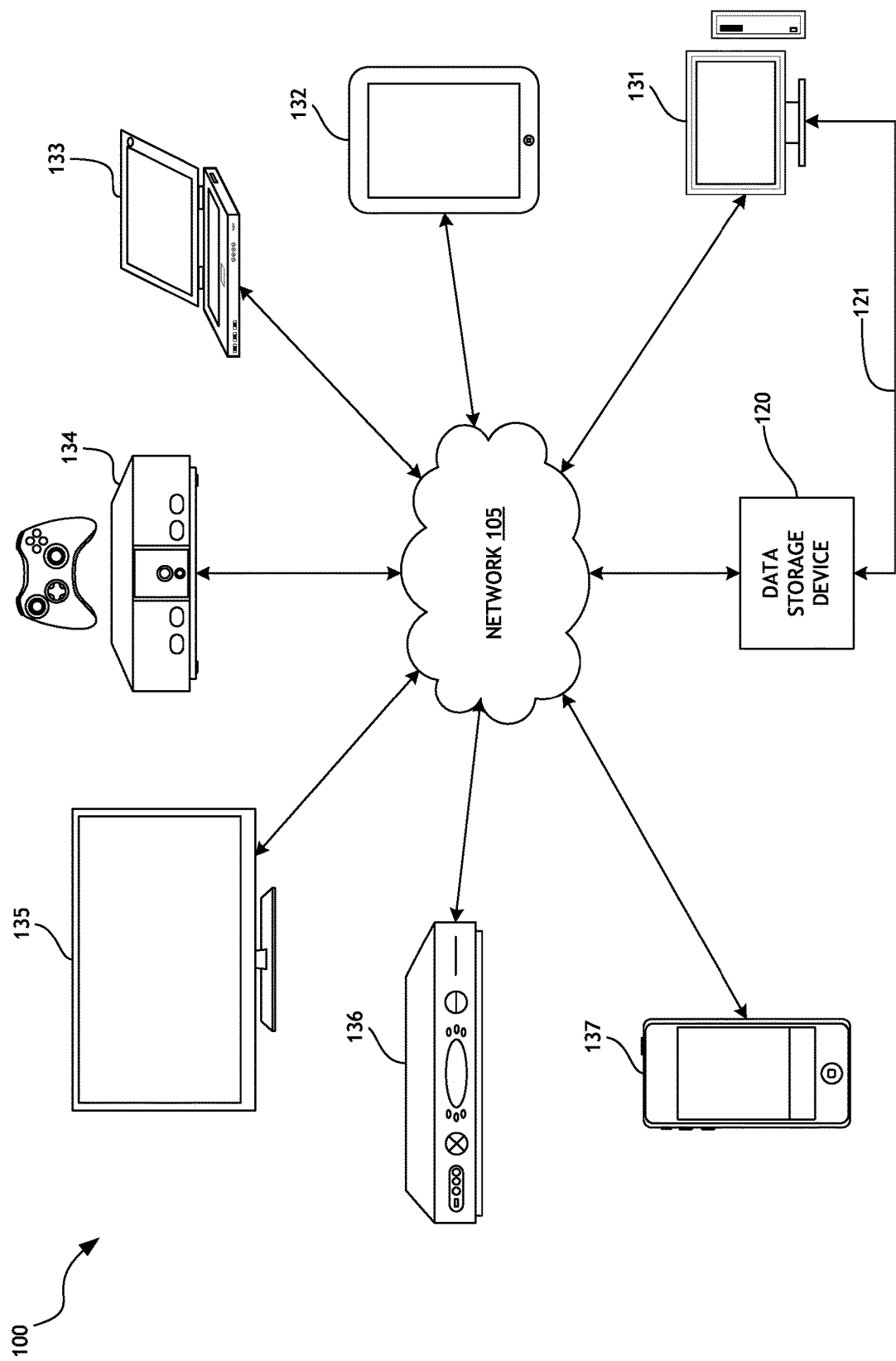
FIG. 1 is a diagram of a data storage system, according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to establishing connections, such as peer-to-peer (P2P) connections, between computing devices that communicate data via network address translations (NATs).

Overview

Data storage devices/systems may provide one or more computing devices with file-level data storage. One example of a data storage device/system may be a DAS device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a DAS interface (e.g., a communication interface such as USB 2.X, USB 3.X, Thunderbolt, eSATA, etc.) of the DAS device. A DAS device may provide a convenient mechanism for transferring data between computing devices, increasing the storage capacity (e.g., increasing the storage space) of a computing device, and/or providing increased data security through data redundancy. Another example of a data storage device/system may be a NAS device. A NAS device may be coupled to a network via a NAS interface (e.g., a network interface or a communication interface such as Ethernet, 802.11 (Wi-Fi), etc.). A NAS device may provide file-level data storage over a network (e.g., a computer network), wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability to establish a connection between computing devices that communicate via NATs. A first computing device may communicate data via a symmetric NAT and a second computing device may communicate data via a cone NAT. The embodiments disclosed herein may provide the ability for the first computing device to establish a connection, such as a peer-to-peer (P2P) connection, between the first computing device and the second computing device via the symmetric NAT and the cone NAT.

Data Storage Devices

FIG. 1 is a diagram of a data storage system 100, according to an embodiment. In the data storage system 100, a data storage device 120 may be communicatively coupled to one or more client devices (e.g., computing devices) in order to provide file-based data storage services to the one or more client devices (e.g., one or more computing devices). Types of client devices (e.g., computing devices) that may have access to the data storage device 120 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other types of computing devices. In one embodiment, the data storage device 120 may be an external standalone data storage device. For example, the data storage device 120 may be a data storage device that is not located within a computing device (e.g., not within a case or housing of a computing device). In another example, the data storage device 120 may be a data storage device that may provide access to data without being directly coupled to a computing device (e.g., may be a NAS device). The client devices (e.g., computing devices) may also be referred to as host systems. In one embodiment, the data storage device 120 may be a portable data storage device. The portable data storage device may lack a power source (e.g., may lack a battery and/or an AC adaptor) and may receive power from the client devices (e.g., host systems).

The data storage device 120 device may provide various client devices (e.g., phones 137, cable set-top boxes 136, smart TV's 135, video game consoles 134, laptop computers 133, tablet computers 132, desktop computers 131) with access to various types of user data stored on the data storage device 120. The data storage device 120 may also allow users to store various types of user data on the data storage device 120. The data storage device 120 may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

With further reference to FIG. 1, the data storage device 120 (e.g., magnetic disk drive, hybrid hard drive, solid-state drive, etc.) may include a controller (not shown in FIG. 1) configured to receive data commands and to execute such commands in one or more non-volatile storage components of the data storage device 120. Such commands may include data read/write commands, and the like. The controller may be configured to receive data commands from a communication interface (e.g., a NAS interface and/or a DAS interface) residing on a computing device (e.g., a host system). Data commands may specify a block address in the data storage device 120 and data may be accessed/transferred based on such commands. The data commands may also be referred to as data access requests.

The data storage device 120 may be configured to store data in one or more magnetic recording disks and/or the solid state memory devices/arrays. In an embodiment, the data storage device 120 may comprise a cable box, a backup disk drive, a media storage unit, a streaming media device, a digital camera, or any other electronic device which may store data that may need to be accessed directly or wirelessly.

In certain embodiments, the data storage device 120 may store data received from a client device such that the data storage device 120 acts as data storage for the client device. To facilitate this function, the data storage device 120 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the data storage device 120. Mapping data indicating the mapping of logical addresses to physical memory addresses may be maintained in the data storage device 120.

In one embodiment, the data storage device 120 may be a DAS device. The DAS device may be directly coupled to client device (e.g., a desktop computer 131) via a connection cable 121. The connection cable 121 may be coupled to a communication interface (e.g., a USB 2.X interface, a USB 3.X interface, a Thunderbolt interface, etc.) of the DAS device (e.g., data storage device 120). In another embodiment, the data storage device 120 may also be a NAS device. The NAS device may also be coupled to the client devices (e.g., computing devices) 131-137 via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof. Although FIG. 1 illustrates the data storage device 120 as being coupled to the client device 131, the data storage device may be coupled to any number of the client devices 131-137 via one or more connection cables in other embodiments.

In one embodiment, the data storage device 120 may receive data access requests from the client devices 131-137 via the communication interface (e.g., a DAS interface such as USB 2.X, USB 3.X, Thunderbolt) and/or via the network interface (e.g., Ethernet, 802.11, etc.). The data access requests may be messages, commands, and/or requests to access data on the data storage device. For example, a data access request may indicate that a computing device wants to read data from the data storage device 120. In another example, a data access request may indicate that a computing device wants to write data to the data storage device 120.

Many computing devices may communicate with other computing devices and/or networks via a NAT. For example, the data storage device 120 (e.g., a computing device) may communicate with other computing devices and/or networks via a NAT. Types of NATs may include, but are not limited to, cone NATs and symmetric NATs. When two computing devices communicate data via two cone NATs, a user datagram protocol (UDP) hole punching technique may be used to allow the two computing devices to establish a connection between each other (e.g., a P2P connection). However, when two computing devices communicate data via a cone NAT and a symmetric NAT, the UDP hole punching technique may not work. This may prevent the two computing devices from establishing a connection (e.g., a P2P connection) with each other. Because both cone NATs and symmetric NATs may be commonly used, it may be desirable to allow two computing devices, that communicate data via a cone NAT and a symmetric NAT, to establish a connection with each other (e.g., to establish a P2P connection with each other).

Figure 2:
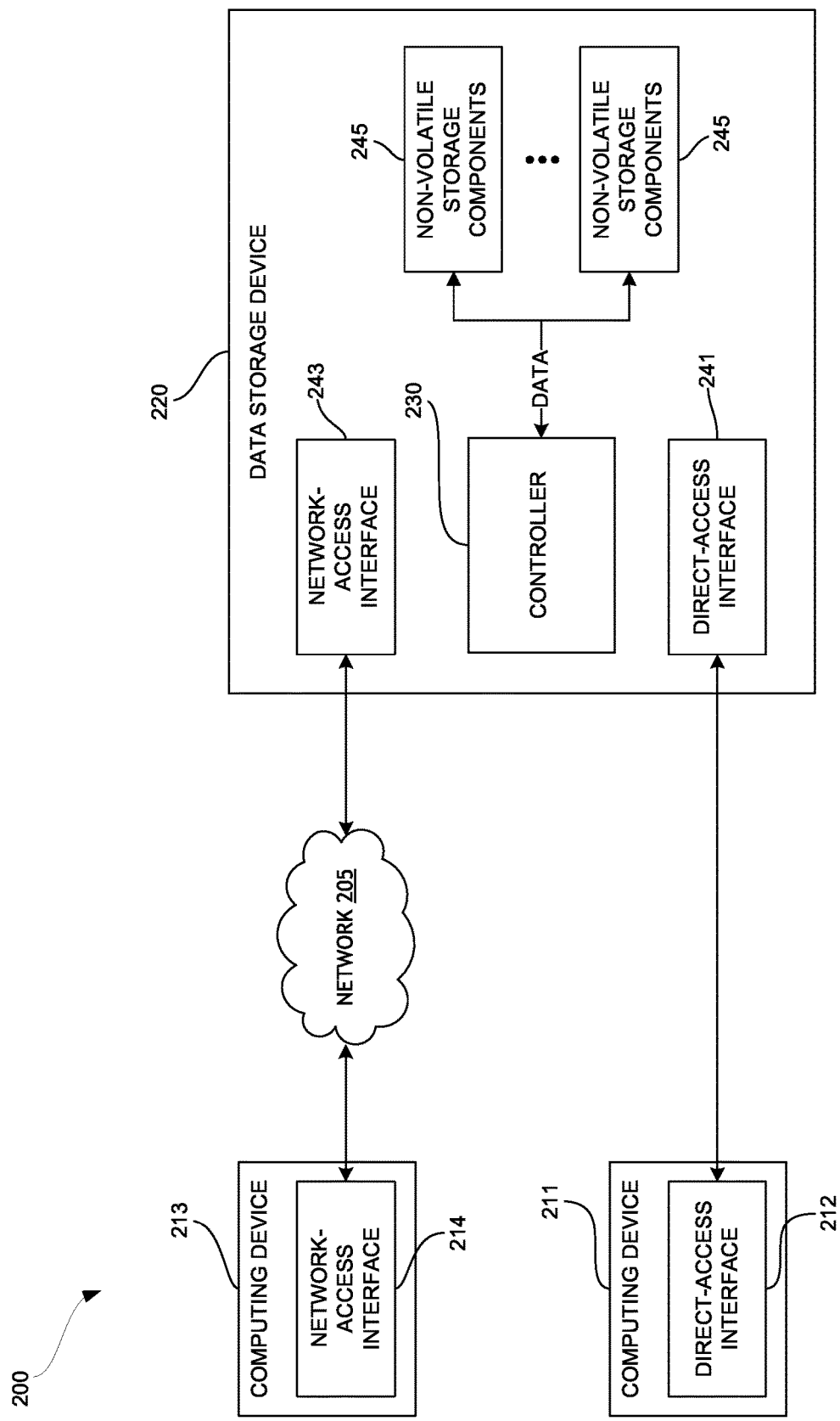
FIG. 2 is a diagram of a data storage system, according to an embodiment.

FIG. 2 is a diagram of a data storage system 200 according to an embodiment. The data storage system 200 includes a computing device 211, a computing device 213, a connection cable, and a data storage device 220. Each of the computing devices 211 and 213 may be a laptop computer, a desktop computer, a server computer, a tablet computer, a smart phone, a set-top box, a smart TV, a video game console, etc. The computing devices 211 and 213 may also be referred to as host systems. The data storage device 220 may include a controller 230, a direct-access interface 241 (e.g., USB 2.X, USB 3.X, Thunderbolt, eSATA, etc.), a network-access interface 243 (e.g., Ethernet, Wi-Fi, etc.), and non-volatile storage components 245. In one embodiment, the non-volatile storage components 245 may include non-volatile magnetic media, and/or solid-state memory, such as NAND flash. The controller 230 may provide overall control for the data storage device 220. In one embodiment, the data storage device 220 may be a portable data storage device. The portable data storage device may lack a power source (e.g., may lack a battery and/or an AC adaptor) and may receive power from the computing device 211 (e.g., a host system).

In certain embodiments, the data storage device 220 may be a hard disk drive. The non-volatile storage components 245 may include one or more disks and the data storage device 220 may further include one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the data storage device 220 may be, for example, a hybrid hard drive including both magnetic media and solid-state media (e.g., the non-volatile storage components 245 may include both magnetic disks and solid state media/memory). In one embodiment, the non-volatile storage components 245 may be coupled to the controller via one or more serial bus connectors. Examples of serial bus connectors include, but are not limited to, serial ATA (SATA) connectors, peripheral component interconnect express (PCIe) connectors, and SATA Express connectors. In one embodiment, the data storage device 220 may be external standalone data storage devices (e.g., NAS devices/drives, portable external hard drives, etc.). In another embodiment, the data storage device 220 may be a portable data storage device. For example, the data storage device 220 may be a portable external hard drive. In another embodiment, data storage device 220 may receive power from the computing device 211 via a connection cable and the direct-access interfaces 212 and 241. For example, the data storage device 220 may not include a power source (e.g., a battery, a power adaptor, etc.) and may operate using power (e.g., voltage, current, etc.) received from the computing device 211 (e.g., a host system).

The controller 230 may receive data access requests (e.g., data and storage access commands) from a DAS interface 212 (e.g., a USB interface, a Thunderbolt interface) of the computing device 211. Data access requests communicated by the DAS interface 212 may include write and read commands issued by the computing device 211. The data access requests may specify a LBA, or range of LBAs, in the data storage device 220, and the controller 230 may execute the received data access requests in the non-volatile storage components 245. The controller 230 may also receive data access request from a NAS interface 214 (e.g., a communication interface such as an Ethernet interface, a Wi-Fi interface, etc.) of the computing device 213. The controller 230 may determine an LBA and/or a range of LBAs in the data storage device 220 based on the data access requests and may execute the received data access requests in the non-volatile storage components 245. In a hybrid hard drive, data may be stored in a magnetic media storage component as well as non-volatile solid-state memory.

The data storage device 220 may store data received from the computing devices 211 and 213, such that the data storage device 220 acts as memory for the computing devices 211 and 213. To facilitate this memory function, the controller 230 may implement a logical interface. The logical interface may present to the computing devices 211 and 213 the memory of the data storage device 220 as a set of logical addresses (e.g., contiguous address) where data can be stored. The controller 230 may map logical addresses to various physical memory addresses in the non-volatile storage components 245 and/or other memory module(s).

The data storage device 220 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization; the array may be accessed by the computing devices 211 and 213 as a single drive. Data may be distributed across the RAID memory modules/drives according to any desirable or practical RAID level, depending on the level of redundancy and/or performance desired. For example, the data storage device 220 may be configured to implement RAID 0, RAID 1, RAID 5, RAID 6, RAID 10, other RAID technology, or other erasure coding technology, depending on data reliability, availability, performance and/or capacity considerations or requirements.

The computing device 211 may be coupled to the data storage device 220 via a connection cable. The connection cable may directly connect the computing device 211 and the data storage device 220. The connection cable may use one or more communication interfaces (such as a bus interface) and/or protocols that may allow the computing device 211 to communicate with the data storage device 220. The direct-access interfaces 212 and 241 may be USB interfaces, Thunderbolt interfaces, serial attached SCSI (SAS), eSATA interface, etc.

In one embodiment, the connection cable may include one or more data lines (e.g., one or more wires, pins, etc.) that allow the computing device 211 to communicate data with the data storage device 220. For example, the connection cable may include data lines (not shown in FIG. 2) that the computing device 211 may use to read data from and/or write data to the data storage device 220. The computing device 211 may communicate data to and from the data storage device using the DAS interface 212 (e.g., via the DAS interface 212). In another embodiment, the computing device 211 may provide an input voltage to the data storage device 220 and the data storage device 220 may use the input voltage to operate one or more components of the data storage device 220 (e.g., the controller 230, the non-volatile storage components 245, a motor, etc.). The connection cable may include one or more voltage lines (e.g., wires, pins, etc.) that may receive the input voltage from the computing device 211 via the DAS interface 212. The one or more voltage lines may provide the input voltage (received from the computing device 211) to the data storage device 220 via the direct-access interface 241. In a further embodiment, the data storage device 220 may be coupled to a separate power source (e.g., may be coupled to a battery, to an AC adaptor, to a wall outlet, etc.).

In one embodiment, the connection cable may include a bridge unit (not shown in FIG. 2). For example, the connection cable may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 220 via a network 205 (e.g., one or more of a Wi-Fi network, a LAN, a cellular network, etc.). The computing device 213 may send data (e.g., files, images, movies, etc.) and/or data access requests to the data storage device 220 via the NAS interface 214 (e.g., a communication interface an Ethernet interface, a Wi-Fi interface, etc.) and the network 205. The data storage device 220 may receive the data and/or data access requests from the computing device 213 via the network-access interface 243.

In one embodiment, the data storage device 220 may include an encryption module (e.g., software, hardware, firmware or a combination thereof) that may encrypt/decrypt data (e.g., files) stored on the non-volatile storage components 245. For example, the encryption module may use encryption keys and/or encryption functions/algorithms to encrypt and/or decrypt data. In another embodiment, the data storage device 220 may include various sensors such as a compass (e.g., a magnetometer), a gyroscope, an accelerometer, a global positioning system (GPS) sensor, a temperature sensor (e.g., a thermometer) etc.

As discussed above, computing devices (e.g., computing device 213, data storage device 220) may communicate with each other via NATs. For example, the computing device 213 may communicate data with the network 205 via a first NAT (not shown in FIG. 2), and the data storage device 220 may communicate data with the network 205 via a second NAT (not shown in FIG. 2). In one embodiment, the first NAT may be a symmetric NAT, and the second NAT may be a cone NAT.

In one embodiment, the controller 230 may create a set of sockets. The first NAT may associate each socket in the set of sockets with an external interface of the first NAT (e.g., associate each socket with a port of the NAT). For example, the first NAT may associate the set of sockets with a set of ports of the first NAT. The controller 230 may create the set of sockets by binding the sockets to port 0 which may allow the first NAT to assign (e.g., randomly assign) the port numbers of the ports (of the first NAT) which are associated with the data storage device 220. The controller 230 may also determine a network address associated with the computing device 213. For example, the controller 230 may determine the Internet Protocol (IP) address associated with the computing device 213.

In one embodiment, the controller 230 may transmit a set of packets to the computing device 213 via the set of sockets and/or the first NAT (e.g., via the ports of the first NAT that are associated with the set of sockets). For example, the controller 230 may transmit one (or more packets) to the computing device 213 via each socket in the set of sockets and/or the first NAT. The controller 230 may determine whether a packet is received from the computing device 213 via a first socket in the set of sockets (e.g., via the set of sockets with random port numbers). The packet (that is received from the computing device 213) may be one packet of a set of packets transmitted by the computing device 213 to the data storage device 220. The computing device 213 may transmit the set of packets to a set of ports (of the first NAT) that are associated with the data storage device 220. For example, the computing device 213 may transmit one (or more) packets to each port in the set of ports. The set of ports may include random port numbers selected by the computing device 213 (e.g., ports that have random numbers selected by the computing device 213).

In one embodiment, the controller 230 may establish a connection with the computing device 213 via the first socket if a packet is received (from the computing device 213) via the set of sockets and/or the first NAT. For example, the controller 230 (and/or the data storage device 220) may establish a peer-to-peer (P2P) connection with the computing device 213 if a packet is received from the computing device 213 via one socket of the set of sockets and/or the first NAT.

In another embodiment, the controller 230 may create a second set of sockets if no packet is received from the computing device 213 via the set of sockets and/or the first NAT. The first NAT may associate each socket in the second set of sockets with an external interface (e.g., a port) of the first NAT. The controller 230 may transmit another set of packets to the computing device 213 via the second set of sockets and/or the first NAT. The controller 230 may determine whether a packet is received from the computing device 213 via a socket of the second set of sockets and/or the first NAT. If the packet is received from the computing device 213 via a socket of the second set of sockets and/or the first NAT, the controller 230 may establish a connection with the computing device 213 via the socket.

In one embodiment, the controller 230 may determine that the first NAT (used by the data storage device 220) and the second NAT (used by the computing device 213) are both symmetric NATs. The controller 230 may refrain from creating the set of sockets, transmitting the set of packets, determining whether the packet has been received, and establishing the connection to the computing device, when the first NAT and the second NAT are both symmetric NATs.

In one embodiment, the controller 230 may determine the number of sockets in the set of sockets (and/or in the second set of sockets). For example, the controller 230 may receive the number of sockets in the set of sockets from another computing device (e.g., a server). In another example, the number of sockets in the set of sockets may be stored in a configuration file and/or configuration data used by the controller 230. In a further example, the controller 230 may calculate the number of sockets in the set of sockets. The number of sockets may be based on a threshold probability of a first port number of the set of ports of the first NAT matching a second port number from the set of port numbers determined by the computing device 213, as discussed in more detail below.

As discussed above, the data storage device 220 may communicate data via a first NAT (not shown in FIG. 2), and the computing device 213 may communicate via a second NAT (not shown in FIG. 2). In one embodiment, the first NAT may be a cone NAT, and the second NAT may be a symmetric NAT.

In one embodiment, the controller 230 may determine a network address associated with the computing device 213. For example, the controller 230 may determine the Internet Protocol (IP) address associated with the computing device 213. The network address (e.g., IP address) associated with the computing device may be assigned and/or allocated by the second NAT. The controller 230 may determine a set of randomly selected port numbers. For example, the controller 230 may select and/or generate random port numbers to be included in the set of randomly selected port numbers (e.g., may use a pseudo-random number generator (PRNG) to generate random port numbers). In another example, the controller 230 may receive the set of randomly selected numbers (e.g., receive the set of randomly selected numbers from another computing device). The controller 230 may also create a socket that may be used to transmit packets to the computing device 213.

In one embodiment, the controller 230 may transmit a set of packets to a set of ports associated with the computing device 213 via the first NAT. For example, the controller 230 may transmit one (or more) packets to each port in the set of ports associated with the computing device 213. Each port in the set of ports may include a port number from the set of randomly selected port numbers.

In one embodiment, the controller 230 may determine whether a first packet of a second set of packets has been received from the computing device 213 via a first port of the set of ports. The second set of packets may be transmitted by the computing device 213 via another set of ports associated with the computing device 213 (e.g., associated with a set of sockets created by the computing device 213). The other set of ports may include port numbers randomly selected by the second NAT. For example, each port in the other set of ports (associated with the computing device 213) may include a port number randomly selected by the second NAT.

In one embodiment, the controller 230 may establish a connection (e.g., a P2P connection) with the computing device 213 via the first socket when a packet is received from the computing device 213 via a first port in the set of ports. In another embodiment, the controller 230 may determine a second set of randomly selected port numbers if no packet is received from the computing device 213 via the set of sockets and/or the first NAT. The controller 230 may transmit another set of packets to a second set of ports associated with the computing device 213 via the first NAT. Each port in the second set of ports may include a port number from the second set of randomly selected port numbers. The controller 230 may determine whether a packet is received from the computing device 213 via a port of the second set of ports. If a packet is received from the computing device 213 via a port of the second set of ports and/or the first NAT, the controller 230 may establish a connection with the computing device 213.

In one embodiment, the controller 230 may determine that the first NAT (used by the data storage device 220) and the second NAT (used by the computing device 213) are both symmetric NATs. The controller 230 may refrain from determining the network address, determining the set of randomly selected port numbers, creating the socket, transmitting the set of packets, determining whether a first packet is received, and establishing the connection with the computing device 213, when both the first NAT and the second NAT are symmetric NATs.

In one embodiment, the controller 230 may determine the number of port numbers in the set of randomly selected port numbers (and/or in the second set of randomly selected port numbers). For example, the controller 230 may receive the number of port numbers from another computing device (e.g., a server) or the number of port numbers may be stored in a configuration file and/or configuration data used by the controller 230. In another example, the controller 230 may calculate the number of port numbers. The number of port numbers may be based on a threshold probability of a first port number from the set of randomly selected port numbers matching a second port number from a second set of ports associated with sockets created by the data storage device 220, as discussed in more detail below.

Establishing Connections Between Computing Devices

Figure 3:
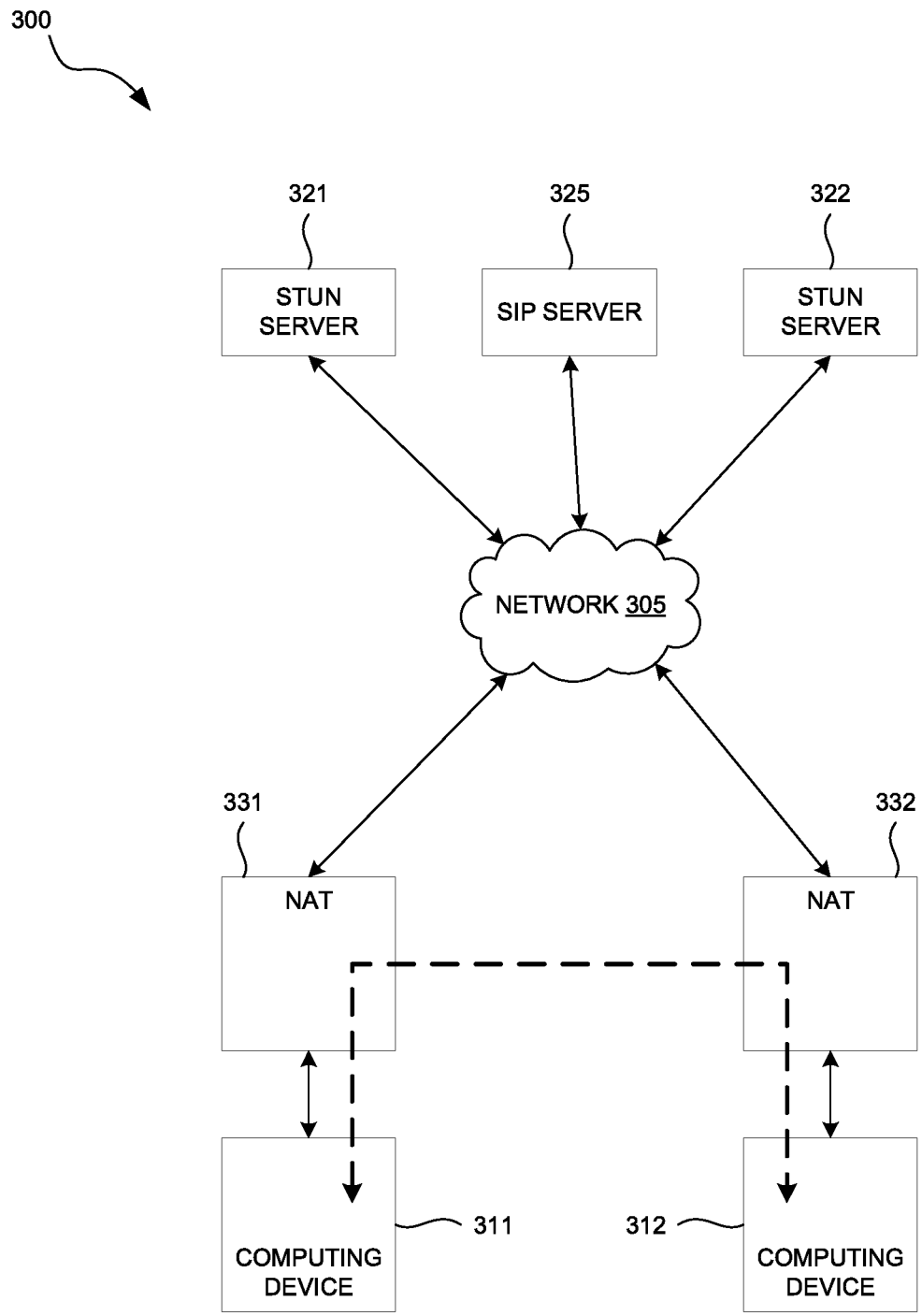
FIG. 3 is a diagram of a data storage system, according to an embodiment.

FIG. 3 is a diagram of a data storage system 300, according to an embodiment. The data storage system 300 includes a network 305, a session traversal utilities for NAT (STUN) server 321, a STUN server 322, a session initiation protocol (SIP) server 325, a NAT 331, a NAT 332, a computing device 311, and a computing device 312. The STUN server 321 may provide the computing device 311 with information about the NAT 331. For example, the STUN server 321 may provide data indicating that the NAT 331 is a cone NAT (or a symmetric NAT) to the computing device 311. The STUN server 322 may provide the computing device 312 with information about the NAT 332. As discussed above, computing devices may communicate (e.g., transmit and/or receive) data with other computing devices and/or networks via NATs. As illustrated in FIG. 3, computing device 311 communicates data via NAT 331, and computing device 312 communicates data via NAT 332. As discussed above, the computing devices 311 and 312 may be computers, tablets, laptops, servers, data storage devices such as NAS drives, etc.

In one embodiment, the computing device 311 may have data to communicate (e.g., transmit/receive) with the computing device 312 or vice versa. A P2P connection (illustrated by the dashed line) may be established between the computing device 311 and the computing device 312 to allow the computing device 311 and the computing device 312 to communicate data directly with each other. The SIP server 325 may assist computing device 311 and computing device 312 with establishing a connection between each other. For example, the SIP server 325 may provide the computing device 311 with a network address associated with the computing device 312 (e.g., a network address allocated to the computing device 312 by the NAT 332), or vice versa. In another example, the SIP server 325 may provide the computing device 311 and the computing device 312 with the types of the NAT 331 and the NAT 332 (e.g., whether the NAT 331 is a cone NAT or a symmetric NAT).

The NAT 331 and the NAT 332 may perform firewall functions and/or may function as a demilitarized zone (DMZ). For example, the NAT 331 may prevent the computing device 311 from receiving packets from the computing device 312 if the computing device 311 has not previously transmitted a packet to the computing device 312. In another example, the NAT 332 may prevent the computing device 312 from receiving packets from the computing device 311 if the computing device 312 has not previously transmitted a packet to the computing device 311. This may prevent the computing device 311 from establishing a connection (e.g., a P2P connection) with the computing device 312. If the NAT 331 and NAT 332 are both cone NATs, a hole punching technique (e.g., a user datagram protocol (UDP) hole punching technique) may be used to establish a P2P connection between computing device 311 and computing device 312. If the NAT 331 and NAT 332 are both symmetric NATs, the computing device 311 and/or the computing device 312 may refrain from establishing the P2P connection between each other, as discussed above.

In one embodiment, the NAT 331 may be a symmetric NAT that allocates port numbers randomly, and the NAT 332 may be a cone NAT. As discussed above, the computing device 311 may create a set of sockets (each socket associated with a random port number of the NAT 331), transmit a set of packets via the set of sockets and the NAT 331, determine whether a first packet has been received from the computing device 312 via the first set of sockets, and establish a P2P connection with the computing device 312 when the first packet has been received. In one embodiment, the computing device 311 may determine the number of sockets in the set of sockets based on a threshold probability of a port number from the set of ports associated with the set of sockets matching another port number from the set of random port numbers determined by the computing device 312.

Also as discussed above, the computing device 312 may determine a network address associated with the computing device 311 (e.g., an IP address), determine a set of randomly selected port numbers, transmit a set of packets to a set of ports associated with the computing device 311, determine whether a first packet has been received from the computing device 311 via a first port of the set of ports associated with the computing device 311, and establish a connection when the first packet is received. In one embodiment, the computing device 312 may determine the number of port numbers in the set of randomly selected port numbers based on a threshold probability of a port number from the set of randomly selected port numbers matching another port number from a set of ports of the NAT 331 associated with a set of sockets created by the computing device 311.

In one embodiment, the threshold probability may be determined and/or calculated by first determining two parameters, Ω1 and Ω2 using the equations (1) and (2) listed below. Ω1 may be number of possible combinations of "n" different random port numbers within a set of "r" port numbers. For example, Ω1 may be the number of combinations of "n" different random port numbers within a set of "r" port numbers that may be selected by the NAT 331. Ω2 may be the number of possible combinations of "m" different random port numbers within a set of "r" port numbers. For example, Ω2 may be the number of combinations of "m" different random port numbers within a set of "r" port numbers that may be selected by computing device 312.

$$\Omega 1 = \frac{r!}{(r-n)! * n!} \quad (1)$$

$$\Omega 2 = \frac{r!}{(r-m)! * m!} \quad (2)$$

The total number of combinations Ω may be determined using equation (3) listed below:

$$\Omega = \Omega 1 * \Omega 2 = \frac{r!}{(r-n)! * n!} * \frac{r!}{(r-m)! * m!} \quad (3)$$

The number N1 may be the number of sets where at least one of the "n" port numbers selected by NAT 331 matches at least one of the "m" port numbers selected by the computing device 312. The number of sets N2 may be the number of sets for which all of the "n" port numbers selected by the NAT 331 are different from the "m" port numbers selected by the computing device 312. N2 may be determined using equation (4) listed below:

$$N2 = \Omega 1 * \frac{(r-n)!}{(r-n-m)! * m!} = \frac{r!}{(r-n)! * n!} * \frac{(r-n)!}{(r-n-m)! * m!} \quad (4)$$

Thus, the probability "P" that at least one of the "n" port numbers selected by NAT 331 matches at least one of the "m" port numbers selected by the computing device 312 may be determined using equation (5) listed below:

$$P = \frac{N1}{\Omega} = 1 - \frac{N2}{\Omega} = \quad (5)$$

$$\frac{\frac{r!}{(r-n)!*n!} * \frac{(r-n)!}{(r-n-m)!*m!}}{\frac{r!}{(r-n)!*n!} * \frac{(r)!}{(r-m)!*m!}} = 1 - \frac{(r-n)! * (r-m)!}{((r-n-m)! * r!)}$$

In one embodiment, the NAT 331 and the computing device 312 may select the same number of random numbers. Thus, when "n" is equal to "m," equation (5) may be rewritten as equation (6) listed below:

$$P = 1 - \frac{((r-n)!)^2}{(r-2n)! * r!} \quad (6)$$

In one embodiment, Stirling's Approximation may be used to compute an approximation of "P" (e.g., to compute an approximation of the probability of a least one port number of a first set of port numbers selected by the computing device 311 matching at least one port number of a second set of port numbers selected by the computing device 312) based on equation (6). Using Stirling's Approximation, equation (6) may be rewritten as equation (7) listed below:

$$P = 1 - e^{2(r-n)\ln(r-n) - r\ln(r) - (r-2n)\ln(r-2n)} \quad (7)$$

Thus, equations (6) and/or equation (7) may be used to determine the probability that at least one port number of a first set of port numbers associated with a set of sockets created by the computing device 311 matching at least one port number of a second set of port numbers randomly selected by the computing device 312, given that each of the first set of port numbers and the second set of port numbers will have "n" port numbers and that there are "r" total port numbers to choose from. In one embodiment, "r" may be set to the value 64511 when the computing device 311 and computing device 312 use UDP to establish the P2P connection. This may be due to the number of available ports that are used by the UDP communication protocol (e.g., 65536 total possible port numbers minus 1025 reserved port numbers). With "r" set to the value 64511, the probability "P" may be determined for various values of "n."

TABLE 1

| n | 100 | 200 | 300 | 400 | 500 | 600 | 700 | 800 | 900 |
|---|---|---|---|---|---|---|---|---|---|
| P | 14.38% | 46.31% | 75.38% | 91.76% | 97.99% | 99.64% | 99.95% | 99.9975% | 99.9997% |

Table 1 above illustrates example probabilities "P" for different values of "n." For example, when "n" is set to the value 100 and "r" is set to the value 64511, the probability "P" is 14.38%. In another example, when "n" is set to the value 600 and "r" is set to the value 64511, the probability "P" is 99.64%. Thus, the value of "n" may be selected to obtain a threshold probability (e.g., a desired probability) of at least one matching port number between the first set of port numbers and the second set of port numbers. For example (referring to table 1 above), if a 99% probability (of at least one matching port number between the first set of port numbers and the second set of port numbers) is desired, the computing device 311 may create 600 sockets, and the computing device 312 may select 600 random port numbers.

Although equations (1) through (7) above illustrate example formulas that may be used to determine the probability of a least one port number of a first set of port numbers selected by the computing device 311 matching at least one port number of a second set of port numbers selected by the computing device 312 (e.g., the probability "P"), one having ordinary skill in the art understands that in other embodiments, other formulas, functions, and/or algorithms may be used. In addition, one having ordinary skill in the art understands that various values of "P," "r," and "n" may be used in the equations (1) through (7).

FIG. 4A is a diagram of a data storage system 400, according to an embodiment. The data storage system 400 includes a computing device 411, a computing device 412, a NAT 431, a NAT 432, and a network 405. As discussed above, the computing device 411 may communicate data with the computing device 412 (and other computing devices and/or networks) via the NAT 431, and the computing device 412 may communicate data with the computing device 411 (and other computing devices and/or networks) via the NAT 432. The NAT 431 includes external interfaces 433, and the NAT 432 includes external interfaces 435. The external interfaces 433 and 435 may be referred to as ports, sockets, etc.

In one embodiment, the NAT 431 is a symmetric NAT. A symmetric NAT may associate each socket created by the computing device 411 with a different external interface 433. For example, a computing device 411 may be associated with multiple external interfaces 433 when the computing device 411 creates multiple sockets. The symmetric NAT may allocate port numbers for the external interfaces 433 randomly. For example, the symmetric NAT may randomly select a port number for an external interface 433 from a set of available port numbers. In another embodiment, the NAT 432 is a cone NAT. For example, the cone NAT may be a full cone NAT, a restricted NAT (e.g., an address-restricted NAT), or a port-restricted NAT. A cone NAT may associate each socket created by the computing device 412 with one external interface 435 (e.g., with the same external interface). For example, the computing device 412 may associate a single external interface 435 with multiple sockets created by the computing device 412.

As illustrated in FIG. 4A, the computing device 411 may create a set of sockets and may transmit a set of packets to the computing device 412 via the set of sockets. The computing device 411 may also determine a network address associated with the computing device 412. The network address associated with the computing device 412 may be allocated and/or assigned by the NAT 432. The computing device 411 may obtain the network address associated with the computing device 412 from another computing device, such as a SIP server. The computing device 411 may transmit a set of packets to the computing device 412 via the set of ports. Each of the sockets created by the computing device 411 may be mapped to and/or associated with an external interface 433 (e.g., a port, a socket, some other communication interface, etc.) of the NAT 431. For example, the NAT 431 may associate the external interface 433 that has the port number 1025 with a first socket of the set of sockets, may associate the external interface 433 that has the port number 21335 with a second socket of the second set of sockets, may associate the external interface 433 that has the port number 47799 with a third socket of the set of sockets, etc. The port numbers for the external interfaces 433 (e.g., ports) may be randomly selected by the NAT 431. Thus, the set of sockets is associated with a set of external interfaces 433 that have port numbers randomly selected by the NAT 431.

Also as illustrated in FIG. 4A, the computing device 412 may determine a network address associated with the computing device 411 (e.g., may receive an IP address associated with the computing device 411 from a SIP server). The network address associated with the computing device 411 may be allocated and/or assigned by the NAT 431. The computing device 412 may determine a set of randomly selected port numbers (e.g., using a PRNG) and may create a socket. The socket may be associated with the external interface 435 that has the port number 47800. The computing device 412 may transmit a set of packets to a set of ports associated with the computing device 411 via the socket and the NAT 432 (e.g., via the socket and the external interface 435 that has the port number 47800). For example, the computing device 412 may transmit a set of packets to a set of external interfaces of the NAT 431. Each external interface 433 in the set of external interfaces may have a port number from the set of randomly selected port numbers.

As discussed above, NAT 431 and 432 may perform firewall functions or may act as DMZs. The NAT 431 may not allow the computing device 411 to receive packets transmitted by the computing device 412 via an external interface 435 (of the NAT 432) if the computing device 411 has not previously transmitted a packet to the computing device 412 via the external interface 435 (of the NAT 432). For example, the NAT 431 may not allow the computing device 411 to receive packets which are transmitted by the computing device 412 via the external interface 435 that has the port number 53222, if the computing device 411 has not previously transmitted a packet to computing device 412 via the external interface 435 that has the port number 53222. In addition, the NAT 432 may not allow the computing device 412 to receive packets transmitted by the computing device 411 via an external interface 433 (of the NAT 431) if the computing device 412 has not previously transmitted a packet to the computing device 411 via the external interface 433 (of the NAT 431). For example, the NAT 432 may not allow the computing device 412 to receive packets which are transmitted by the computing device 411 via the external interface 433 that has the port number 47800, if the computing device 412 has not previously transmitted a packet to computing device 411 via the external interface 433 that has the port number 47800.

As discussed above, the set of sockets created by the computing device 411 is associated with a set of external interfaces 433 which, in turn, has a set of randomly selected port numbers. Also as discussed above, the computing device 412 determines a second set of randomly selected port numbers and transmits a set of packets to a second set of external interfaces 433 that have port numbers from the second set of randomly selected port numbers. If at least one port number from the set of randomly selected port numbers (associated with the set of sockets created by the computing device 411) matches at least one port number from the second set of randomly selected port numbers (determined by the computing device 412), the computing device 411 may be able to establish a connection (e.g., a P2P connection) with the computing device 412 via the NAT 431 and the NAT 432. For example, if at least one port number from the first set of randomly selected port numbers matches at least one port number from the second set of randomly selected port numbers, then the computing device 411 may receive a packet from the computing device 412 via an external interface 433 from which the computing device 411 transmitted a packet to computing device 412. Because the NAT 431 received a packet from the computing device 412 via an external interface 433 from which the computing device 411 transmitted a packet to the computing device 412, the NAT 431 may allow the computing device 411 to receive packets from the computing device 412 and vice versa.

The number of sockets in the set of sockets created by the computing device 411 and/or the number of port numbers selected by the computing device 412 may be selected based on a threshold probability of at least one matching port number between the first set of randomly selected port numbers and the second set of randomly selected port numbers. For example (referring to table 1 above), if a 99% probability (of at least one matching port number between the first set of randomly selected port numbers and the second set of randomly selected port numbers) is desired (e.g., a threshold probability of 99% is desired), the computing device 411 may create 600 sockets, and the computing device 412 may select 600 random port numbers. One having ordinary skill in the art understands that other threshold probabilities (e.g., 75%, 90%, etc.) may be desired, and a different number of sockets and/or a different number of port numbers may be selected based on the other threshold probabilities. The threshold probability may be based on user input and/or may be based on configuration settings/parameters of the computing device 411 and the computing device 412.

Figure 4B:
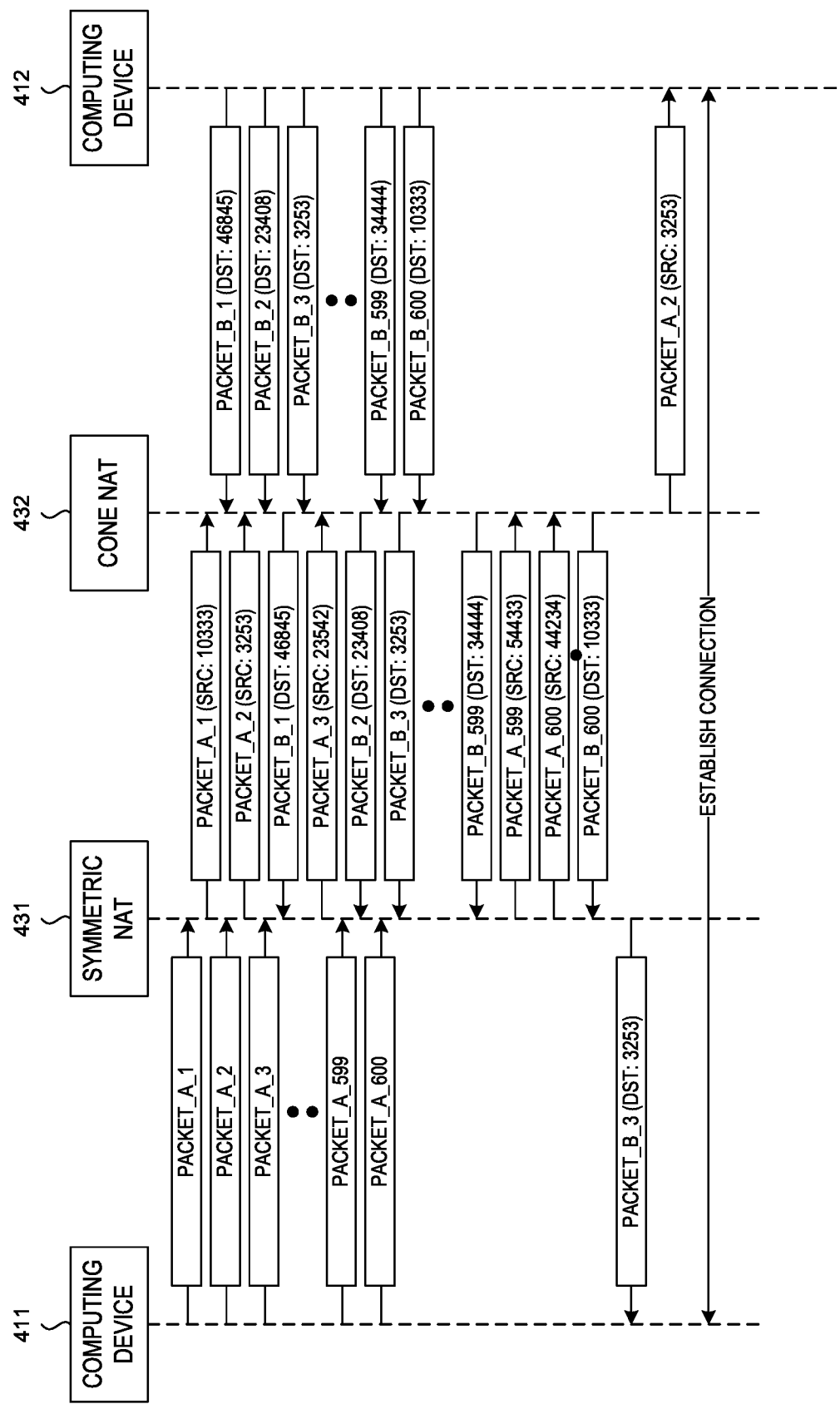
FIG. 4B is a sequence diagram illustrating example packets and/or messages, according to an embodiment.

FIG. 4B is a sequence diagram illustrating example packets and/or messages, according to an embodiment. As discussed above, a data storage system (e.g., data storage system 400 illustrated in FIG. 4A) includes a computing device 411, a computing device 412, a NAT 431, a NAT 432, and a network 405. As discussed above, the computing device 411 may communicate data with the computing device 412 via the NAT 431, and the computing device 412 may communicate data with the computing device 411 via the NAT 432. In one embodiment, the NAT 431 is a symmetric NAT, and the NAT 432 is a cone NAT.

As illustrated in FIG. 4B, the computing device 411 may create 600 sockets (e.g., a set of sockets) and may transmit 600 packets (e.g., a set of packets) via the 600 sockets and the NAT 431 (e.g., via a symmetric NAT). In one embodiment, the computing device 411 may pause a period of time (e.g., sleep for a few milliseconds, a second, etc.) between transmitting each of the 600 packets. The set of packets includes packets PACKET_A_1 through PACKET_A_600. The NAT 431 may associate each socket with a port (e.g., an external interface) of the NAT 431. For example, the NAT 431 may associate the socket that transmitted PACKET_A_1 with the port 10333 of the NAT 431, and the NAT 431 may forward PACKET_A_1 to the NAT 432 and/or the computing device 412 via port 10333 (as illustrated by the source SRC: 10333 of PACKET_A_1). In another example, the NAT 431 may associate the socket that transmitted PACKET_A_599 with the port 54433 of the NAT 431, and the NAT 431 may forward PACKET_A_599 to the NAT 432 and/or the computing device 412 via port 54433 (as illustrated by the source SRC: 54433 of PACKET_A_599).

Also as illustrated in FIG. 4B, the computing device 412 may transmit 600 packets (e.g., a set of packets) via a socket (e.g., a single socket) and the NAT 432 (e.g., via a cone NAT), as discussed above. In one embodiment, the computing device 412 may also pause a period of time (e.g., sleep for a few milliseconds, a second, etc.) between transmitting each of the 600 packets. The set of packets includes packets PACKET_B_1 through PACKET_B_600. The computing device 412 may transmit each packet to a randomly selected port of the NAT 431, as discussed above. For example, PACKET_B_3 may be transmitted to port 3253 of the NAT 431 (as illustrated by the destination DST: 3253 of PACKET_B_3). In another example, PACKET_B_600 may be transmitted to port 10333 of the NAT 431 (as illustrated by the destination DST: 10333 of PACKET_B_600).

As discussed above, if at least one port number from the first set of randomly selected port numbers of the NAT 431 (which are associated with the 600 sockets created by the computing device 411) matches at least one port number from the second set of randomly selected port numbers of the NAT 431 (determined by the computing device 412), the computing device 411 may be able to establish a connection (e.g., a P2P connection) with the computing device 412 via the NAT 431 and the NAT 432. As illustrated in FIG. 4B, the socket that transmitted PACKET_A_2 is associated with port 3253 of the NAT 431 and PACKET_B_3 is transmitted by the computing device 412 to port 3253 of the NAT 431. Thus, the port number 3253 associated with the first set of sockets created by the computing device 411 matches the port number 3253 selected by the computing device 412. This may allow the computing device 411 to establish a connection to the computing device 412 via the NAT 431 and the NAT 432.

Figure 5:
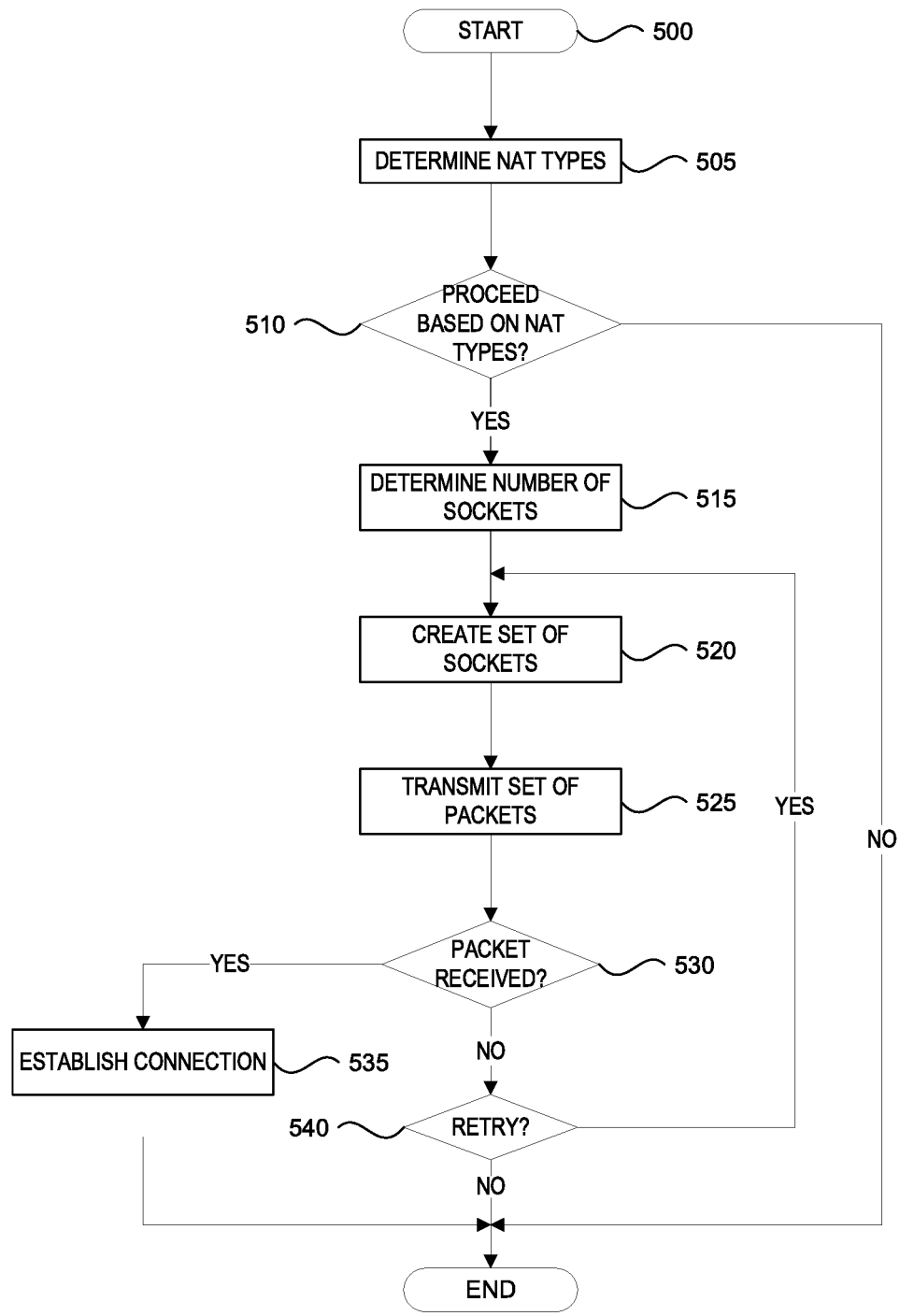
FIG. 5 is a flow diagram illustrating a process for establishing a connection between computing devices, according to an embodiment.

FIG. 5 is a flow diagram illustrating a process 500 for establishing a connection between computing devices, according to an embodiment. The process 500 may be performed by a controller, a processing device (e.g., a processor, a central processing unit (CPU)), and/or a computing device (e.g., a laptop, a NAS device, etc.). The controller, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process 500 determines the types of the NATs that are used by the computing devices. For example, process 500 may determine whether a first NAT used by a first computing device is a symmetric NAT or a cone NAT. The process 500 may also determine whether a second NAT used by a second computing device is symmetric NAT or a cone NAT. At block 510, the process 500 determines whether to proceed based on the types of the NATs. If both the first NAT and the second NAT are symmetric NATs, the process 500 may end (e.g., the process 500 may refrain from determining a number of sockets, creating the set of sockets, transmitting a set of packets, etc.). If the first NAT is a symmetric NAT and the second NAT is a cone NAT, the process 500 proceeds to block 515 where the process 500 determines a number of sockets. The number of sockets may be determined based on a threshold probability (e.g., a desired probability), as discussed above. In one embodiment, the number of sockets may be received from another computing device or may be provided by a user, as discussed above.

At block 520, the process 500 creates the set of sockets (e.g., may create 600 sockets, as illustrated in FIG. 4B). Each socket in the set of sockets may be associated with a port (e.g., an external interface) of the first NAT. The first NAT may select random port numbers for the set of ports associated with the set of sockets, as discussed above. The process 500 may transmit a set of packets via the set of sockets and/or the first NAT (e.g., the set of ports of the first NAT that are associated with the set of sockets) at block 525. For example, the process 500 may transmit 600 packets via the 600 sockets, as illustrated in FIG. 4B.

At block 530, the process 500 determines whether a packet was received from a second computing device via at least one socket in the set of sockets, as discussed above. If a packet was received via a socket of the set of sockets, the first computing device may establish a connection with the second computing device at block 535. For example, a P2P connection may be established between the first computing device and the second computing device. If no packet is received from second computing device via the set of sockets, the process 500 may determine whether to perform blocks 520, 525, and 530 again (e.g., whether to create a second set of sockets, transmit a second set of packets, etc.) at block 540. For example, the process 500 may determine whether user input indicating that the process 500 should perform blocks 520, 525, and 530 again, has been received. In another example, the process 500 may analyze a configuration file or configuration setting to determine whether to perform blocks 520, 525, and 530 again (e.g., the configuration file may indicate that the process 500 should perform blocks 520, 525, and 530 a certain number of times). If the blocks 520, 525, and 530 should be performed again, the process 500 may proceed to block 520. If the blocks 520, 525, and 530 should not be performed again, the process 500 may end.

Figure 6:
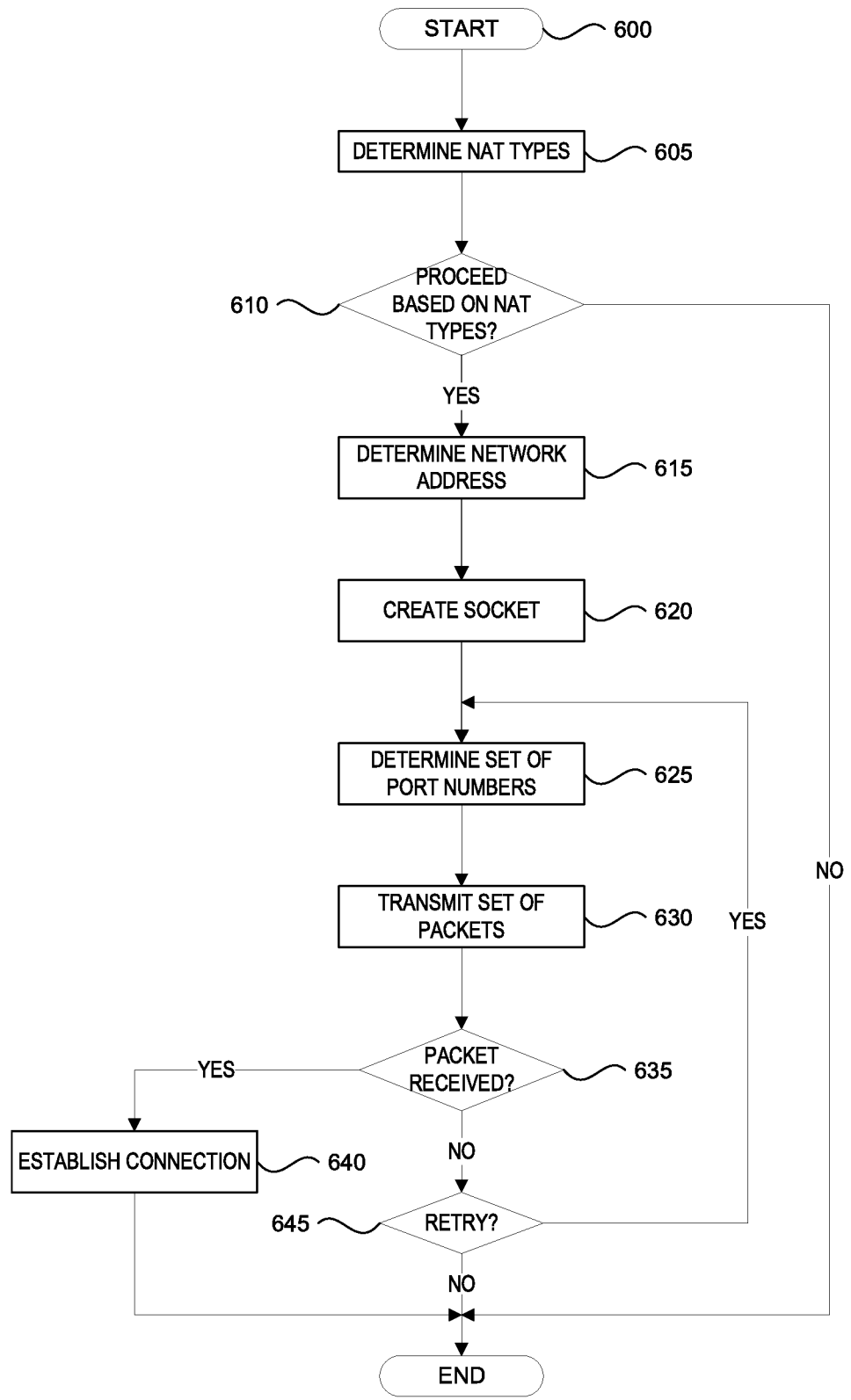
FIG. 6 is a flow diagram illustrating a process for establishing a connection between computing devices, according to an embodiment.

FIG. 6 is a flow diagram illustrating a process 600 for establishing a connection between computing devices, according to an embodiment. The process 600 may be performed by a controller, a processing device (e.g., a processor, a central processing unit (CPU)), and/or a computing device (e.g., a laptop, a NAS device, etc.). The controller, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

The process 600 begins at block 605 where the process 600 determines the types of the NATs that are used by the computing devices. For example, process 600 may determine whether a first NAT used by a first computing device is a symmetric NAT or a cone NAT. The process 600 may also determine whether a second NAT used by a second computing device is symmetric NAT or a cone NAT. At block 610, the process 600 determines whether to proceed based on the types of the NATs. If both the first NAT and the second NAT are symmetric NATs, the process 600 may end (e.g., the process 600 may refrain from determining a network address, creating a socket, determine a set of port numbers, etc.). If the first NAT is a cone NAT, and the second NAT is a symmetric NAT, the process 600 proceeds to block 615 where the process 600 determines a network address (e.g., an IP address) associated with the second computing device. At block 620, the process 600 creates a socket that may be used to transmit packets to the second computing device.

The process 600 may determine a set of randomly selected port numbers at block 625. The number of port numbers in the set of randomly selected port numbers may be determined based on a desired probability (e.g., a threshold probability), as discussed above. In one embodiment, the number of port numbers may be received from another computing device or may be provided by a user, as discussed above. At block 630, the process 600 transmit a set of packets to the second computing device. For example, the process 600 may transmit 600 packets via the socket, as illustrated in FIG. 4B.

At block 635, the process 600 determines whether a packet was received from a second computing device from a port of the set of randomly selected port numbers, as discussed above. If a packet was received via a port of the set of randomly selected port numbers, the first computing device may establish a connection with the second computing device at block 640. For example, a P2P connection may be established between the first computing device and the second computing device. If no packet is received via a port of the set of randomly selected port numbers, the process 600 may determine whether to perform blocks 625, 630, and 635 again (e.g., whether to determine a second set of port numbers, whether to transmit a second set of packets, etc.) at block 645. For example, the process 600 may determine whether user input indicating that the process 600 should perform blocks 625, 630, and 635 again, has been received. In another example, the process 600 may analyze a configuration file or configuration setting to determine whether to perform blocks 625, 630, and 635 again (e.g., the configuration file may indicate that the process 600 should perform blocks 625, 630, and 635 a certain number of times). If the blocks 625, 630, and 635 should be performed again, the process 600 may proceed to block 625. If the blocks 625, 630, and 635 should not be performed again, the process 600 may end.

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A method for communicating from a first device behind a first network address translation (NAT) to a second device, the method comprising:
   determining a number of ports required to achieve a desired probability of a first amount of randomly-selected port numbers having at least one matching port number with a second amount of randomly-selected port numbers, wherein the desired probability is at least 90% and the number of ports is less than 2% of selectable port numbers;
   creating a first set of sockets associated with a first set of ports of the first NAT, the first set of ports equal to the determined number of ports, the first set of ports having at least 100 port numbers randomly selected by the first NAT;
   transmitting a set of packets to the second device via the first set of sockets;
   waiting to receive, on the first device, a first packet from the second device on the first set of sockets, the second device configured to transmit using at least another 100 randomly-selected port numbers;
   determining whether the first packet has been received from the second device via a first socket of the first set of sockets; and
   responsive to the first packet being received, establishing a connection from the first device to the second device via the first socket.

2. The method of claim 1, wherein the second device communicates data via a second NAT.

3. The method of claim 2, further comprising determining that the first NAT and the second NAT are not both symmetric NATs.

4. The method of claim 2, wherein:
   the first NAT comprises a symmetric NAT; and
   the second NAT comprises a cone NAT.

5. The method of claim 1, further comprising:
   creating a second set of sockets responsive to no packets being received from the second device via the first set of sockets, wherein the second set of sockets is associated with a third set of ports of the first NAT and wherein the third set of ports comprises port numbers randomly selected by the first NAT;
   transmitting a second set of packets to the second device via the second set of sockets and the third set of ports;
   determining whether a second packet has been received from the second device via a second socket in the second set of sockets; and
   establishing the connection to the second device via the second socket responsive to the second packet being received.

6. The method of claim 1, further comprising determining a number of sockets in the first set of sockets.

7. The method of claim 1, wherein determining the number of ports comprises receiving the number of ports from another device.

8. The method of claim 1, wherein determining the number of ports comprises receiving the number of ports from a user.

9. The method of claim 1, wherein the number of ports is determined using the following formula:

$$P=1-e^{2(r-n)ln(r-n)-r\ ln(r)-(r-2n)ln(r-2n)},$$

wherein: P=the desired probability,
n=the number of ports, and
r=total of the selectable port numbers.

10. A method for communicating data through a first network address translation (NAT), the method comprising:
   determining a network address associated with a computing device;
   determining a number of ports required to achieve a desired probability of a first amount of randomly-selected port numbers having at least one matching port with a second amount of randomly-selected port numbers, wherein the desired probability is at least 90% and the number of ports is less than 2% of selectable port numbers;

determining a first set of randomly-selected port numbers based on the determined number of ports, the first set of randomly-selected port numbers comprising at least 100 port numbers;

transmitting a set of packets to a set of ports associated with the computing device via a first socket and the first NAT, wherein each port in the set of ports comprises the network address and a port number from the first set of randomly-selected port numbers;

waiting to receive a first packet from the computing device on the set of ports, the computing device configured to transmit to a second set of at least 100 randomly-selected port numbers selected by a second NAT;

determining whether the first packet has been received from the computing device via a first port of the set of ports; and establishing a connection to the computing device via the first socket responsive to the first packet being received.

11. The method of claim 10, wherein:
the second set of at least 100 randomly-selected port numbers is associated with the computing device; and
the computing device communicates data via the second NAT.

12. The method of claim 11, wherein:
the first NAT comprises a cone NAT; and
the second NAT comprises a symmetric NAT.

13. The method of claim 11, further comprising determining that the first NAT and the second NAT are not both symmetric NATs.

14. The method of claim 11, further comprising:
determining a third set of randomly-selected port numbers;
transmitting a second set of packets to a second set of ports associated with the computing device via the first socket and the first NAT, wherein each port in the second set of ports comprises the network address and a port number from the third set of randomly-selected port numbers;
determining whether a second packet has been received from a second port of the second set of ports; and
establishing a connection to the computing device via the first socket responsive to the second packet being received.

15. The method of claim 10, wherein determining the number of ports comprises receiving the number of ports from another device.

16. The method of claim 10, wherein determining the number of ports comprises receiving the number of ports from a user.

17. The method of claim 10, wherein the number of ports is determined using the following formula:

$$P=1-e^{2(r-n)ln(r-n)-r\ ln(r)-(r-2n)ln(r-2n)},$$

wherein: P=the desired probability,
n=the number of ports, and
r=total of the selectable port numbers.

18. A method for communicating data through a first network address translation (NAT) and a second NAT, the method comprising:
determining a number of ports required to achieve a desired probability of a first amount of randomly-selected port numbers having at least one matching port number with a second amount of randomly-selected port numbers, wherein the desired probability is at least 90% and the number of ports is less than 2% of selectable port numbers;
transmitting, from a first computing device behind the first NAT, a first set of packets to a second computing device behind the second NAT via a first set of sockets, wherein the first set of sockets is associated with a first set of ports of the first NAT and wherein the first set of ports comprises port numbers randomly-selected by the first NAT based on the determined number of ports;
determining whether a first packet has been received from the second computing device via a first socket of the first set of sockets;
establishing a connection to the second computing device via the first socket responsive to the first packet being received;
transmitting, from the second computing device behind the second NAT, a second set of packets to a second set of ports associated with the first computing device, wherein each port in the second set of ports comprises a network address associated with the first computing device and a port number from a set of randomly-selected port numbers;
determining whether a second packet has been received from a second port of the second set of ports; and
establishing a connection to the first computing device via the second port responsive to the second packet being received.

19. The method of claim 18, further comprising determining that the first NAT and the second NAT are not both symmetric NATs.

20. The method of claim 18, wherein the number of ports is determined using the following formula:

$$P=1-e^{2(r-n)ln(r-n)-r\ ln(r)-(r-2n)ln(r-2n)},$$

wherein: P=the desired probability,
n=the number of ports, and
r=total of the selectable port numbers.

* * * * *